Sept. 17, 1968 C. P. N. AABERG 3,401,621
PLANT FOR VENTILATION OF ROOMS, MORE PARTICULARLY IN STABLES
Filed July 6, 1966 3 Sheets-Sheet 1

Sept. 17, 1968         C. P. N. AABERG         3,401,621
  PLANT FOR VENTILATION OF ROOMS, MORE PARTICULARLY IN STABLES
Filed July 6, 1966                         3 Sheets-Sheet 3

United States Patent Office 3,401,621
Patented Sept. 17, 1968

3,401,621
PLANT FOR VENTILATION OF ROOMS, MORE PARTICULARLY IN STABLES
Carl Peter Noe Aaberg, Poul Andersensvej 10, Holstebro, Denmark
Filed July 6, 1966, Ser. No. 563,209
Claims priority, application Denmark, July 8, 1965, 3,470/65; Apr. 5, 1966, 1,770/66
15 Claims. (Cl. 98—33)

ABSTRACT OF THE DISCLOSURE

A ventilating system is provided for stables and the like comprising means for admitting fresh air to a room, and means for drawing air toward the ceiling of the room, for forcing a part of the air drawn toward the ceiling out through a vent and for forcing the remaining air which is drawn toward the ceiling radially out into the room for recirculation thereby causing the temperature in the room to be substantially uniform throughout and renewing the air near the floor so that livestock will receive an ample supply of fresh air.

---

Figure 1:
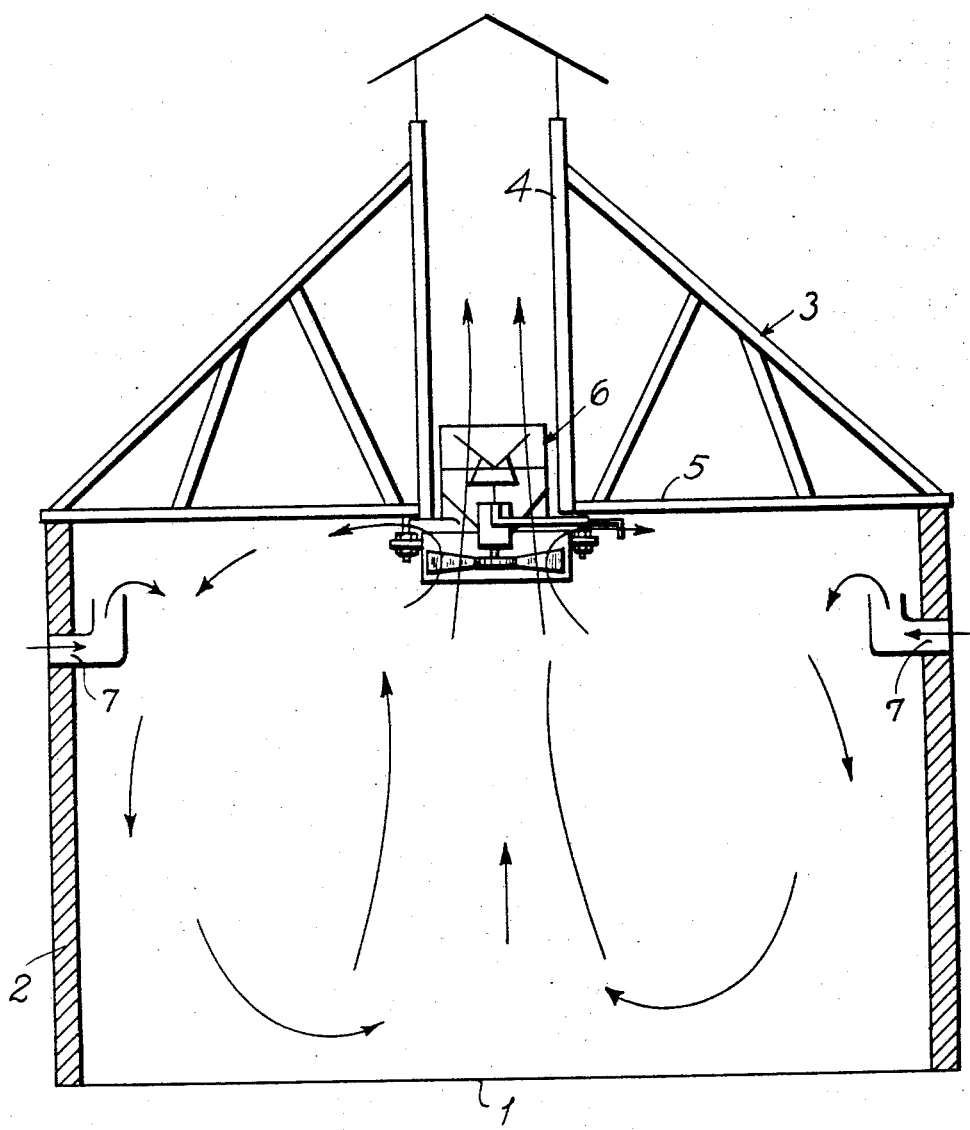

The invention relates to a plant for ventilation of rooms, more particularly in stables and similar rooms, from which the foul air is removed through a vent pipe at the ceiling by means of an electrically driven ventilating device which is mounted at the inner opening of the said vent pipe.

Known plants of the said kind for stables are controlled by means of a thermostat acted upon by the temperature in the stable, and when the temperature rises beyond a predetermined level, the electrically driven ventilating device is started so that part of the air in the room is drawn into the vent pipe, hence escaping into the open. The air is taken from the uppermost part of the room, that is, beneath the ceiling, where the temperature is at its maximum, and by the partial vacuum produced by the ventilating device fresh air is drawn into the stable through leakages and/or valves mounted in the walls of the room.

The known plants cannot effectively renew the air in the areas where the animals are kept, that is, near the floor, where the air besides being cool is foul and therefore unfavourable to the health and well-being of the animals.

To relieve this drawback it is necessary to produce circulation of the air in the room so that the temperature may be kept substantially uniform throughout the room and the air near the floor may be adequately renewed. So far, it has only been possible to effect such a ventilation and air circulation by means of complicated and costly plants not generally adopted in conventional stables, where for the time being a plant of the kind referred to in the first paragraph has had to suffice; such a plant serves only to remove part of the air from the room, taking this air from the uppermost layers inside same.

It is the object of the present invention to provide a simple plant of the aforesaid kind which can be manufactured and installed at a cost corresponding substantially to the conventional ventilating plants.

An essential feature of the plant according to the invention is that the ventilating device comprises means adapted to force a part of the air sucked from the room out through the vent pipe, and means adapted to force the remaining air radially out in the room for re-circulation.

It has been found that with the use of such a plant the air in a stable will be substantially better than by normal air ventilation. A damp and unwholesome stable becomes dry and warm after a short operation of such a plant, which is due to the fact that the air is circulated, whereby the temperature difference between ceiling and floor is reduced to a minimum because the plant predominantly passes the foul and moist air at the floor out to the atmosphere. At the same time it is found that the ventilation may be increased substantially, that is, at a definite temperature more air may be sucked in from the open than is possible by means of a known plant. This is accomplished by means of a single ventilating device mounted in usual manner beneath the vent pipe and adapted to carry out the combined function by comparatively simple means.

Figure 2:
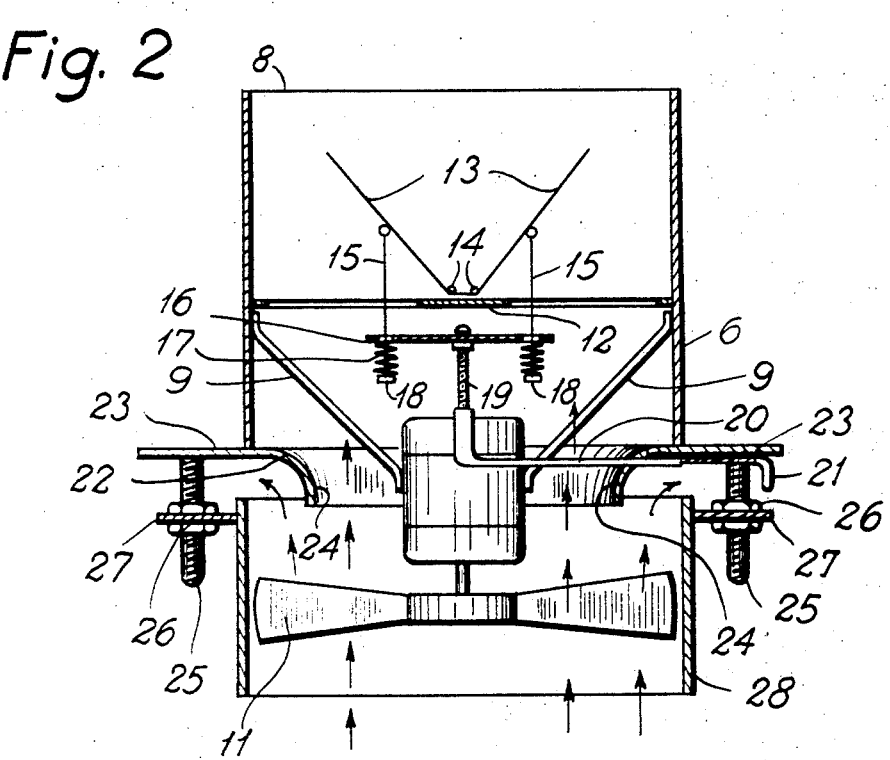
Figure 3:
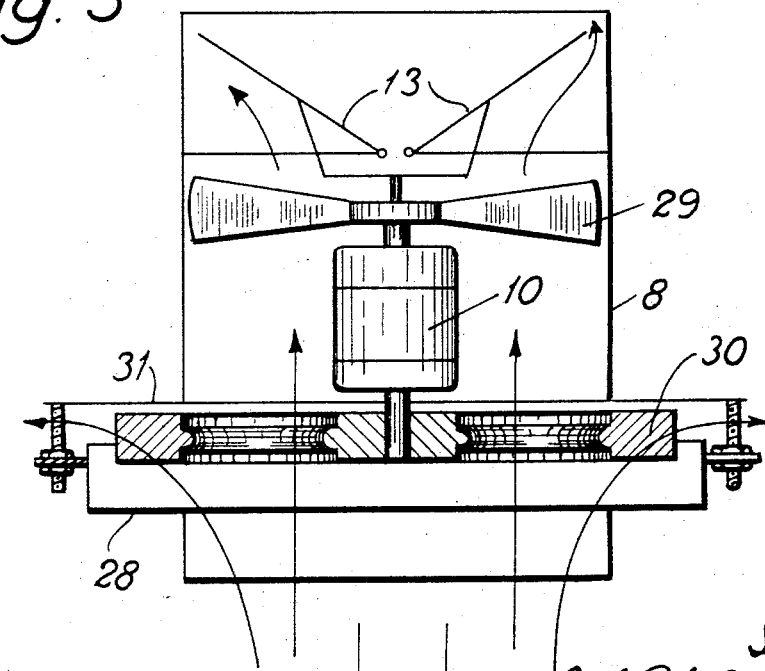
Figure 4:
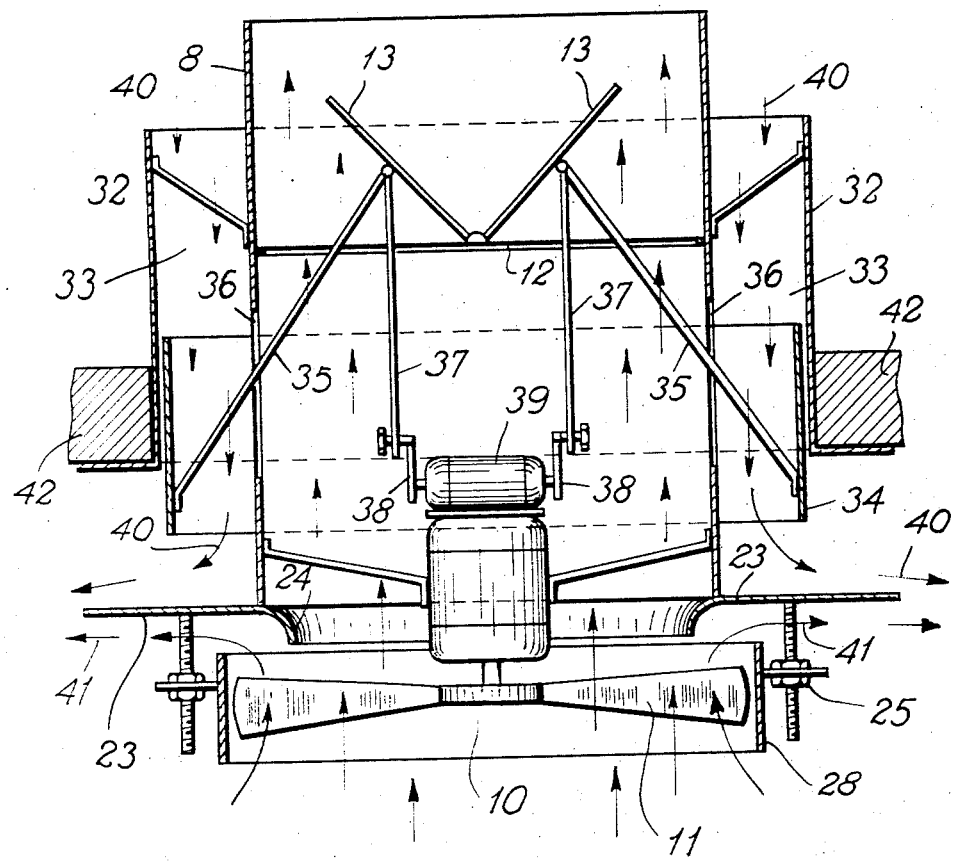

Some embodiments of a ventilating plant according to the invention will now be described with reference to the drawing, in which FIGURE 1 is a section through a stable, viewed from the end, FIGURE 2 is a section through a ventilating plant according to the invention, viewed from the side, FIGURE 3 is the same as FIGURE 2, showing a modified embodiment, FIGURE 4 is the same as FIGURE 2, showing a modified embodiment.

FIGURE 1 represents a stable with a floor 1, vertical walls 2 and a roof 3 in which there is a vertical vent pipe 4. Where the said pipe is passed through the ceiling 5 is mounted a ventilating plant denoted as a whole by 6 and shown in FIGURE 2 on a larger scale.

In the walls 2 are provided intake openings 7 through which fresh air from the outer atmosphere is sucked into the room.

The ventilating plant 6 consists of a total unit which may be mounted as such in the vent pipe 4, the plant consisting of a casing 8 of tubular form in which an electromotor 10 is mounted by means of braces 9. The said electromotor 10 has a vertical shaft to which is attached a fan 11.

Above the electromotor is located a device 12 carrying two pivotal air regulating dampers or flaps 13 adapted to pivot about horizontal shafts 14. The two dampers 13 are connected through drawbars 15 with a yoke 16, passing through holes provided in same, and being provided on the underside of the yoke with a coil spring 17 and a shoulder 18.

The central part of the yoke 16 is connected with a coil spring 19 extending through a tube 20 and provided at its opposite end with a lever 21 by means of which the coil spring 19 may be moved to and fro in the tube 20, whereby the yoke 16 may be moved upwards and downwards. The lower part of the casing 8 is provided with an annular member 22 consisting of a flat, annular disc 23, which is attached to the casing 8, and of a substantially tubular part 24 which is coaxial with the casing 8 and the fan 10, 11.

To the underside of the member 23 are attached pins 25 carrying two nuts 26 by means of which a flange 27 provided on a tube 28 which surrounds the fan 11 is retained in adjustable position.

As indicated by the arrows in FIGURE 2, the fan is drawing an axial air stream vertically up through the tube 28, the said stream being subsequently divided in a flow continuing up through the casing 8 and another flow which on account of the pressure at the periphery of the tube 28 is forced axially outwards through the slot between the upper edge of the tube 28 and the guiding member 22. The amount of the last mentioned part of the air may be varied by adjusting the nuts 26 so as to vary the height of the said slot.

As will appear from FIGURE 1, the said ventilating plant produces an air circulation indicated by arrows and consisting of air sucked into the room through the openings 7, substantially horizontally or upwardly directed, until the air flow is engaged by the radial air flow from the fan, after which both of the said air flows will tend to move down towards the floor of the room, hence to pass towards the centre of the room, from where the fan is subjecting it to suction in vertical upward direction.

The upward axial air flow keeps the dampers 13 open to an extent dependent upon the adjustment, but when the electromotor 10 stops, the dampers will fall down and close the vent pipe.

The best result is obtained by a plant according to the invention if the fan is working as much as possible and the air intake openings 7 are as small as possible at all, since the comparatively low temperature of the air discharged through the vent pipe in such a plant provides an effective ventilation with a comparatively subtantial intake of fresh air, and at the same time there is a constant renewal and heating of the air near the floor.

FIGURE 3 shows a modified embodiment using two fan wheels, one of which is a purely radial wheel and the other one a purely axial wheel. Inside the casing 8 is, as described in the foregoing, mounted an electromotor 10 the shaft of which extends at both ends of the motor, carrying an axial fan wheel 29 above and a purely radial fan wheel 30 below. The latter is surrounded by an adjustable tube 28 and its vanes are located outside the periphery of the casing 8, that is, below a horizontal wall 31.

The air sucked into the room in axial vertical direction is divided into two flows, that is, directly passing the inactive, central part of the fan wheel 30, being only subjected to the action of the fan wheel 29, and another flow which is only acted upon by the vanes of the fan wheel 30 and thus is thrown radially to the sides.

In this embodiment the radially thrown air, that is, the air circulated in the building, is partly independent of the position of the dampers 13, while these will have a certain influence upon the total capacity of the fan in the embodiment shown in FIGURE 2. In the embodiment according to FIGURE 3 the two fan wheels are acting partly independently of each other, but the unit constitutes, however, a comparatively compact combined entity.

The two fan wheels 29 and 30 may, if necessary, be driven each by its separate motor, whereby it becomes possible to control the fan wheels independently of each other, for example by means of thermostats.

When a part of the air is distributed into the room by the ventilator, that is, beneath the ceiling for re-circulation, it will be very advantageous to place intake channels for fresh air near the said air stream so that the fresh air introduced joins the flow beneath the ceiling and is mixed with the re-circulated air. Such an embodiment is shown in FIGURE 4 according to which the intake channel is designed as an annular chamber surrounding the vent pipe. The advantages of this arrangement is that the air intake flow is uniformly distributed throughout the whole room, that it is always, even in cold weather, heated before getting further down into the room, that the fresh air has the longer distance to flow and the inferior air the shorter distance to flow to the ventilator and that the cold air sucked into the room is lying nearest to the ceiling so that the heat transmission to same is reduced and the exchange of air is increased.

If intake valves in the side walls are dispensed with, the climate in the stable becomes independent of the direction and force of the wind, which is very advantageous.

As indicated in FIGURE 4, the tube 8 is surrounded by an outer coaxial tube 32, thus forming between the said two tubes an annular passage 33 communicating at its upper end with the outer atmosphere and below opening at a substantial distance from the guiding plate 23.

In the annular passage is provided a damper having the form of a tube 34 slidably disposed in the tube 32 and connected with drawbars 35 which, again, are connected with the air dampers 13 in the vent pipe 8, the said drawbars 35 extending through slits 36 provided in the said tube. The dampers 13 are by means of drawbars 37 connected with arms 38 provided on a thermostat-controlled servomotor 39.

By means of the said servomotor the two dampers 13 and 34 may be adjusted simultaneously, and it will be obvious from the figure that the tube 34 may project more or less from the tube 32 and thus vary the discharge area of the inflowing fresh air which is indicated by the arrows 40.

The fresh intake air 40 will be distributed radially beneath the ceiling 42 by the radial flow of air 41 from the fan and be mixed with the re-circulation air.

By this arrangement a complete novel venting plant is provided, where it is possible by simple, compact mechanical means automatically to thermostat control the complete air renewal and circualting system.

What I claim and desire to secure by Letters Patent is:
1. A ventilation system for a substantially hermetically closed room such as a stable or the like, comprising:
air exhaust means mounted in a central part of the celing of said room, said air exhaust means having an outlet for discharging air to the atmosphere and and an inlet for receiving air from said room;
fan means mounted at said inlet of said air exhaust means, said fan means having rotor means for generating a substantially vertical, upwardly moving air current in said room under said air exhaust means with part of said air current being forced into said atmosphere through said air exhaust means and the remainder of said air current being forced radially outwardly from said air exhaust means adjacent said ceiling of said room; and
air intake means for discharging a controlled air volume into an upper part of said room from said atmosphere when said air exhaust means is in operation.
2. In the ventilation system of claim 1:
said air exhaust means comprising a vent pipe having an inlet at the ceiling of said room;
said rotor means of said fan means comprising a fan wheel mounted directly beneath said inlet of said vent pipe and driven by motor means; and
guide means for directing air from said room axially into said fan wheel in a substantially vertical direction and for directing air leaving said fan wheel partly in an axial direction upwards into said vent pipe and partly in a radial direction over said fan wheen and beneath said ceiling.
3. In the ventilation system of claim 1:
said air exhaust means comprising a vent pipe having an inlet opening at the ceiling of said room; and
said rotor means of said fan means comprising a first fan wheel mounted directly beneath said inlet of said vent pipe, said first fan wheel having a central part formed to permit axial flow of air, said first fan wheel having a peripheral part formed to discharge air radially into the room and said rotor means of said fan means comprising a second fan wheel located inside said vent pipe for forcing air which has passed axially through said first fan wheel out through said vent pipe to said atmosphere and said first and second fan wheels being driven by motor means.
4. In the ventilation system of claim 2:
said guide means having a guiding member fixed relative to said ceiling, said guiding means having a tube surrounding said fan wheel and co-axial with said fan wheel, said tube being vertically adjustable with respect to said ceiling and said fixed guiding member, and said tube being spaced from said fixed guiding member to form an annular discharge slot for radially ejecting a portion of the air discharged from the fan wheel into said room.
5. In the ventilation system of claim 2:
said guide means having a tube surrounding said fan wheel and co-axial with said fan wheel, said guide means having a guiding member fixed relative to said ceiling, said guiding member having a tubular portion extending from said inlet of said vent pipe, said tubular portion of said guiding member having a smaller diameter than said tube surrounding said fan wheel and said tubular portion of said guiding member being disposed with respect to said tube surrounding said fan wheel to form a peripheral, annular zone cut off in an axial direction from said vent pipe.

6. In the ventilation system of claim 1:
said air exhaust means comprising a vent pipe having an inlet at the ceiling of said room;
said air intake means comprising at least one intake channel mounted near said vent pipe, said at least one intake channel having an opening disposed in such a manner that incoming fresh air from said at least one intake channel is mixed with and distributed into said room by the recirculated air discharged from said fan means.

7. In the ventilation system of claim 6:
first air damper means in said at least one intake channel;
second air damper means in said vent pipe;
means connecting said first air damper means and said second air damper means to permit simultaneous regulation of said damper means.

8. In the ventilation system of claim 7:
said first and second air damper means being controlled by thermostat means.

9. In the ventilation system of claim 1:
said air exhaust means comprising a vent pipe having an inlet at the ceiling of said room;
said air intake means comprising a tube co-axial with said vent pipe and having a diameter greater than said vent pipe with an annular passage defined by said tube and said vent pipe communicating at its upper end with the atmosphere and at its lower end with said room.

10. In the ventilation system of claim 9:
first air damper means in said annular passage;
second air damper means in said vent pipe;
means connecting said first air damper means and said second air damper means to permit simultaneous regulation of said damper means.

11. In the ventilation system of claim 10:
said first and second air damper means being controlled by thermostat means.

12. In the ventilation system of claim 9:
air damper means in said annular passage, said air damper means comprising an intermediate tube vertically displaceable with respect to said tube and adapted to extend below said tube.

13. In the ventilation system of claim 2:
said air intake means comprising a tube co-axial with said vent pipe and having a diameter greater than said vent pipe with an annular passage defined by said tube and said vent pipe communicating at its upper end with the amtosphere and at its lower end with said room such that incoming air from said air intake means is mixed with and distributed into said room by the recirculated air directed radially outwardly from said fan wheel by said guide means.

14. In the ventilation system of claim 13:
first air damper means in said annular passage;
second air damper means in said vent pipe;
means connecting said first air damper means and said second air damper means to permit simultaneous regulation of said damper means.

15. In the ventilation system of claim 14:
said first and second air damper means being controlled by thermostat means.

References Cited

UNITED STATES PATENTS

| 2,106,700 | 2/1938 | Aukerman | 98—33 |
| 2,532,268 | 11/1950 | Christmann. | |
| 2,700,331 | 1/1955 | Miller | 98—33 X |
| 3,122,307 | 2/1964 | Wasson et al. | 98—33 X |
| 3,221,632 | 12/1965 | Copp | 98—33 |
| 3,267,995 | 8/1966 | Maudlin | 98—33 X |

FOREIGN PATENTS 157,507    9/1932    Switzerland.

ROBERT A. O'LEARY, *Primary Examiner.*